INVENTORS
J. E. TATE
D. E. BORENSTEIN
I. L. LANGLEY, JR.
J. A. BANNING
BY Young & Luigg
ATTORNEYS

United States Patent Office 3,684,459
Patented Aug. 15, 1972

3,684,459
PLUG METERED EVAPORATIVE REACTION TUBE
John E. Tate, Louisville, Ky., and David E. Borenstein, Isaac L. Langley, Jr., and Jack A. Banning, Greenville, S.C., assignors to Phillips Fibers Corporation
Filed Aug. 20, 1970, Ser. No. 65,534
Int. Cl. C08f 1/98
U.S. Cl. 23—285      7 Claims

ABSTRACT OF THE DISCLOSURE

Apparatus comprising a vertical evaporative tube wherein a plug is positioned in the uppermost part of the tube to meter monomer evenly over the inner surface of the tube. Preferably the tube becomes smaller toward the bottom end thereof and a filter is provided to remove solid matter prior to metering the reactants into the tube. Further uniformity of the film is achieved by providing a matte surface on the interior of the tube.

BACKGROUND OF THE INVENTION

This invention relates to improved apparatus for polycondensation reactions.

Older processes for the production of polyester resins involved polycondensation of monomer in a stirred reactor under vacuum. However, such procedures were not satisfactory for a number of reasons. For one thing, any unexpected delay could lead to deterioration of the monomer. Also, it was difficult to provide enough surface area for the glycol to escape. Continuous polymerization systems offer certain advantages over batch systems and thus are being used to a greater extent. However, problems with monomer deterioration and insufficient surface area for glycol removal persist, and if anything, are increased due to higher quality standards imposed on the final product.

BRIEF SUMMARY OF THE INVENTION

It is an object of this invention to provide improved apparatus for carrying out polycondensation reactions;

It is a further object of this invention to provide apparatus which will allow the production of a uniform film of reactants in a polycondensation reaction;

It is yet another object of this invention to provide apparatus which allows exposure of a large surface area of material being reacted; and It is a still further object of this invention to provide dependable apparatus for polycondensation reactions so as to reduce interruptions.

In according to with the invention, apparatus is provided comprising a vertical tubular reactor having a metering plug at the upper end thereof.

BRIEF DESCRIPTION OF THE DRAWINGS

In the drawings, forming a part hereof, wherein like reference characters denote like parts in the various views.

DESCRIPTION OF THE PREFERRED EMBODIMENTS

Figures 1, 2:
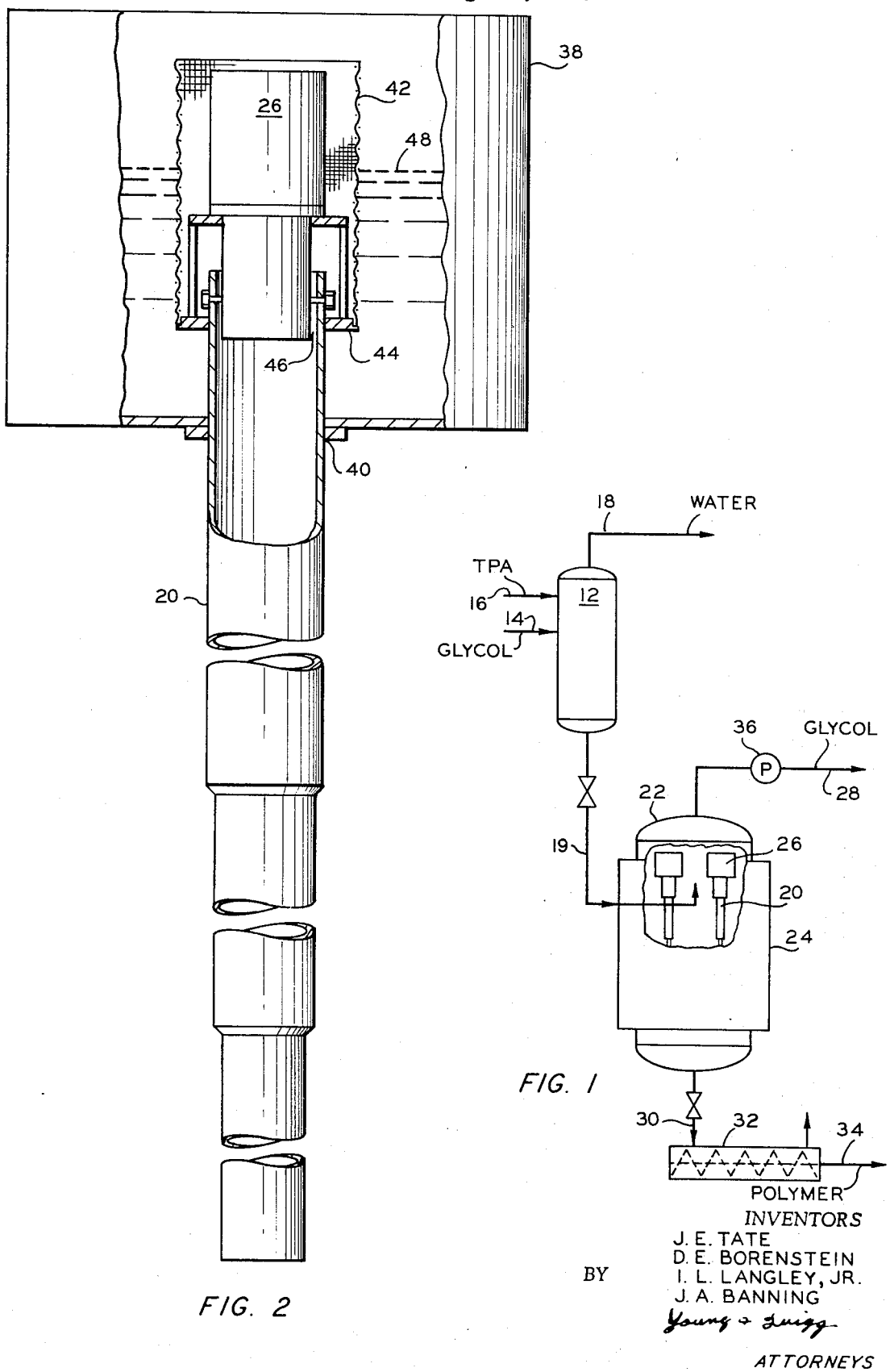
FIG. 1 is a schematic representation of a polycondensation system utilizing metered reaction tubes of the instant invention.
FIG. 2 is a detailed view of one plug metered reaction tube.

While this apparatus is described hereinafter primarily in connection with polycondensation of bis(2-hydroxyethyl) terephthalate from direct esterification, the apparatus is equally useful in the polycondensation of bis (2-hydroxyethyl) terephthalate from ester interchange or even the polymerization of low molecular weight polyethylene terephthalate, and the polycondensation of hexamethylene adipate, caprolactam, and the like.

As used herein, the word monomer is meant to refer to a single unit such as bis(2-hydroxyethyl) terephthalate or to low molecular weight prepolymers which are subject to further polymerization.

The plug, tube reactor, and other materials with which the reactants come in contact can be made from conventional construction materials such as seamless stainless steel.

It is essential that the monomer be distributed evenly around the entire surface area of the tube and remain a continuous film as it flows downward. To insure a continuous film initially, a plug is positioned within the upper end of a tube as will be described in detail hereinafter. Preferably, a feed reservoir is provided around the plug so that a head of monomer is present. This allows for a uniform distribution, even though the tube might be slightly offset from a perfectly vertical position. Without this head, even a slight offset in the vertical disposition of the tube would result in uneven formation of the film initially. Also, it allows uniform feed to multiple tubes.

To insure continuity of the continuous film after it has been formed, the inner surface of the tube preferably has a matte finish, for instance, a finish having a roughness of 15–100, preferably 25–50, microinches rms. Also, the tubes can be made to converge toward the lower end. This compensates for the fact that as the film of monomer flows downward, it becomes more viscous due to the polycondensation and also is reduced in volume, due to the evaporation of the glycol being formed. This generally more than offsets the tendency of the higher temperature to reduce the viscosity. Thus, in order to insure a continuous film, the surface area of the interior of the tube is reduced. This can be accomplished either by making the tube conical which is generally preferred, or to provide a tube with cylindrical sections of progressively decreasing diameter which sections are connected by a smooth transitient shoulder area. This latter arrangement has the advantage of being less difficult to fabricate and also provides some mixing of the reactants at each transition from one size tube to the other. Further, standard tubing size can be used thus giving the advantage of the invention with apparatus which is less, rather than more, complex and expensive as compared with conventional systems.

To further insure that the film is continuous initially and to preclude the possibility of having to shut down the apparatus to clean out the metering section, a filter is preferably provided to screen out solid particles of contaminate. Preferably, this filter is simply a screen disposed about the plug through which the monomer must flow to reach the plug, the screen having openings no larger than the spacing between the metering plug and the inner surface of the tube.

The size of the tubing can vary greatly, but it is generally relatively small, for instance, 2 to 3 inches at the top, thus requiring an increase in the number of reaction tubes rather than an increase in the size in order to raise throughput.

Referring now to the drawings, ethylene glycol and terephthalic acid are introduced into vessel 12 via lines 14 and 16 respectively. Within vessel 12 the monomer, bis(2-hydroxyethyl) terephthalate (BHET), is formed and the resulting water which is split off is removed via line 18. The resulting BHET is fed via line 19 from this monomer supply means to vertical reaction tubes 20 disposed within shell 22. Jacket 24 through which heating fluid such as glycol is circulated constitutes a means for temperature conditioning said shell. Metering plugs 26 can be seen disposed in the top of tubes 20. Ethylene glycol spit off during the polycondensation reaction within said tubes is withdrawn via line 28. The resulting polyethylene terephthalate having generally about 8–16 degrees of polymerization which flows from the lower end of tubes 20 is withdrawn via line 30 and introduced into screw finisher 32. The finished polymer flows by means of line 34 to suitable filament forming means or film casting means (not shown).

Vacuum pump 36 provides a means to pull a vacuum within said tubes so as to induce the polycondensation reaction to take place by removing the glycol formed thereby.

Referring now to FIG. 2, there is shown in greater detail the plug metered reaction tube 20 of FIG. 1. As can be seen, tube 20 decreases in diameter toward the bottom end thereof in stepped increments. Tube 20 is disposed in feed reservoir 38 (not shown in FIG. 1) which feed reservoir is open at the top and closed on all sides with the bottom thereof being sealed to tube 20 around area 40. BHET is introduced into feed reservoir 38 by line means 19 shown in FIG. 1. Disposed within the upper open end of tube 20 is metering plug 26. Metering plug 26 is axially adjustable. Thus, depending on the viscosity of the monomer and the head in the reservoir, the plug can be moved axially to vary the opening length and thus achieve the desired flow and thus the desired thickness of the film. Disposed about plug 26 is filter screen 42. Filter screen 42 is open at the top and closed around all sides and is sealed to a bottom support member 44. Thus, the monomer must flow through screen 42 and thence through annulus 46 formed between the outer surface of the plug and the inner surface of the upper end of the tube. Liquid level in the reservoir is shown by line 48. Since an object of the invention is to distribute a thin film of monomer evenly over the entire inner surface of the tube, it is apparent that the width of the annulus gap 46, the height of the head of monomer in the feed reservoir and the depth of the plug insertion into the tube are all interrelated. However, with a liquid head of a few inches and plug insertion of one inch or so and a monomer with a viscosity of bis(2-hydroxyethyl) terephthalate, this gap will generally be about 10 to 75, preferably 20 to 50 mils.

CALCULATED ILLUSTRATIVE EMBODIMENT

Terephthalic acid and ethylene glycol are introduced into a vessel under conditions proper to produce bis(2-hydroxyethyl) terephthalate with the resulting water which is split off being taken off from the top of the vessel. The thus formed BHET is introduced into the feed reservoirs of reaction tubes contained in a shell as shown in FIGS. 1 and 2. The reaction tube is made of seamless stainless steel having an O.D. of 2.85 and an I.D. of 2.50 inches at the upper end thereof. This tube has an intermediate section having an internal diameter of 2.25 inches and a final section having an internal diameter of 2.00 inches. The plug is also made of stainless steel and has an outside diameter such that an annular gap of 0.030 inch exists between said plug and the inner surface of said tube. This plug is inserted into the tube a distance of one inch and the head of BHET adjusted so that a flow rate of 12 pounds per hour per tube is achieved. A vacuum is drawn by means such as is shown in the drawings and a heat exchange medium is circulated through an outer jacket to bring the temperature up to that required to effect polycondensation. The resulting polymer is fed to a screw finishing means where additional heat is applied under reduced pressure and the finished polymer is fed to a spinnerette and formed into polyester filament. The operation is continued without interruption for long periods of time with the resulting polymer having exceptionally uniform properties due to the uniformity of the film in the reaction tubes.

While this invention has been described in detail for the purpose of illustration, it is not to be construed as limited thereby but is intended to cover all changes and modifications within the spirit and scope thereof.

We claim:
1. Apparatus comprising in combination:
   at least one vertical reaction tube, said tube being open at each end and having a matte finish on an inner surface thereof;
   a metering plug in the upper end of said tube, said plug having an outside diameter slightly less than the inside diameter of said tube, and being so disposed relative to said tube as to form an open annulus between said plug and said tube;
   a feed reservoir enclosed on all sides and the bottom with said bottom sealed against said tube;
   a screen disposed within said reservoir and around said plug, said screen having openings no larger than the annular gap between said plug and said tube;
   a shell disposed about said tube and reservoir;
   means to heat said shell; and
   means to pull a partial vacuum within said tubes.
2. Apparatus according to claim 1 wherein said tubes converge from top to bottom.
3. Apparatus according to claim 2 wherein said tubes are conical.
4. Apparatus according to claim 2 wherein said tubes comprise a series of cylinders of decreasing diameter connected by shoulder means.
5. Apparatus according to claim 1 wherein the inner surface of said tubes has a roughness of 25–50 microinches R.M.S.
6. Apparatus according to claim 1 wherein said tubes are within the range of 2–3 inches in diameter at the top portion thereof.
7. Apparatus according to claim 1 wherein said plug is axially adjustable.

References Cited
UNITED STATES PATENTS

| | | | |
|---|---|---|---|
| 341,669 | 5/1886 | Lillie | 159—13 A |
| 2,662,911 | 12/1953 | Dorschner et al. | 23—288 U X |
| 2,279,548 | 4/1942 | Bailey | 165—179 X |
| 2,121,708 | 6/1938 | Miguel | 165—119 |
| 3,410,758 | 11/1968 | Coanda | 203—11 X |
| 2,889,211 | 6/1959 | Rodenacker et al. | 23—283 |

JAMES H. TAYMAN, JR., Primary Examiner

U.S. Cl. X.R.

23—283, 252 A; 159—13 A, 49; 55—42, 52, 199; 260—75 M, 95 R